April 4, 1939.  O. WITTEL  2,153,221
ADAPTER FOR MINIATURE LANTERN SLIDES
Filed Feb. 4, 1938
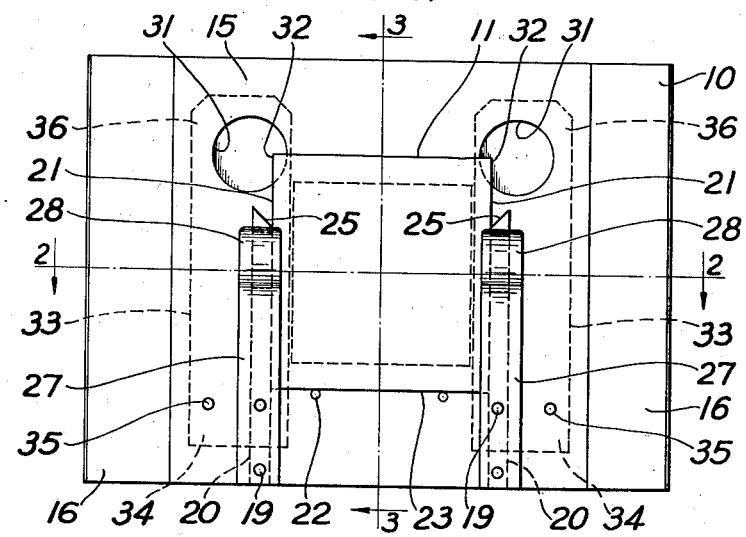
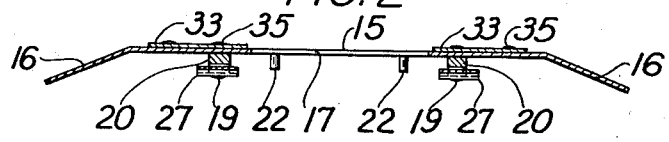
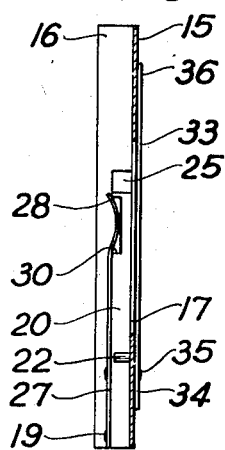 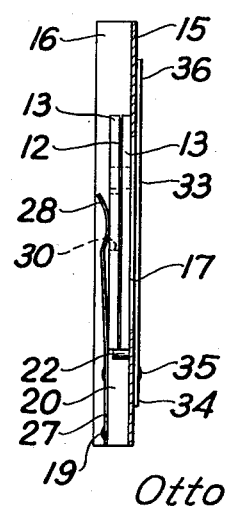
Otto Wittel
INVENTOR
BY
ATTORNEYS Patented Apr. 4, 1939

2,153,221

UNITED STATES PATENT OFFICE 2,153,221

ADAPTER FOR MINIATURE LANTERN SLIDES

Otto Wittel, Rochester, N. Y., assignor to Eastman Kodak Company, Rochester, N. Y., a corporation of New Jersey Application February 4, 1938, Serial No. 188,687

4 Claims. (Cl. 88—26)

The present invention relates to projectors, and more particularly to an adapter for use with slides for miniature transparencies such, for example, 35-mm. film.

One object of the invention is the provision of an adapter intended for use with projector slide carriages designed for standard size lantern slides which are much larger than slides for miniature film.

Another object of the invention is the provision of an adapter in which the miniature slides may be easily and quickly inserted, and when inserted will be resiliently and accurately positioned, yet are readily removable and replaceable.

Still another object of the invention is the provision of an adapter of the class described which is simple in construction, relatively inexpensive to manufacture, and highly effective in use.

To these and other ends, the invention resides in certain improvements and combination of parts, all as will be hereinafter more fully described, the novel features being pointed out in the claims at the end of the specification.

In the drawing:

Fig. 1 is a front elevation view of a slide adapter constructed in accordance with the preferred embodiment of the invention;

Fig. 2 is a horizontal sectional view taken substantially on the line 2—2 of Fig. 1, showing the arrangement of the various parts of the adapter;

Fig. 3 is a vertical sectional view taken substantially on the line 3—3 of Fig. 1; and Fig. 4 is a view similar to Fig. 3, but showing a miniature slide inserted in the adapter.

Similar reference numerals throughout the various views indicate the same parts.

The present invention is embodied, in the present instance, in an adapter 10 intended for use with slides 11 for miniature transparencies. These slides may be formed, for example, by positioning an image area of a transparency such as 35-mm. film, generally indicated at 12, Fig. 4, between two sheets of substantially rigid transparent material such as glass plates 13, as is well known to those in the art. These miniature slides are much smaller than standard lantern slides. Therefore, in order to adapt these smaller slides to projector carriages designed for standard lantern slides, the present invention provides a holder or adapter which may be positioned in the projector carriage and which removably positions the miniature slides therein.

Fig. 1 shows a miniature slide adapter constructed in accordance with the preferred embodiment of the invention. This adapter comprises a strip of rigid material, preferably metal, which is formed to provide a central flat portion 15 and inclined side portions 16, as clearly shown in Fig. 2. This adapter is of suitable size to fit in a slidable carriage designed for the usual standard lantern slides. The central portion 15 is formed with a square viewing aperture 17 in which the image area of the miniature film 12 of the slide 11 may be framed, as later described. The rear face of the portion 15 has secured thereto, as by rivets 19, a pair of spaced metal side rails 20 positioned adjacent opposite sides of the aperture 17, and arranged to engage the side edges 21 of the slide 11. A pair of pins 22 extend outwardly from the portion 15 and engage the bottom edge 23 of the slide 11 to support the latter. The guide rails 20 and the pins 22 are so positioned that when the slide 11 is positioned in the adapter, the film 12 is in registry with an aperture 17. To facilitate the insertion of the slide 11 between the guide rails 20, the upper edges thereof are beveled, as shown at 25, Fig. 1.

A pair of leaf springs 27 overlie and are secured to the rails 20 by suitable fastening means such as rivets. Obviously the same rivets or fastening means may be used to secure both the rails 20 and the springs 27 to the rear face of the portion 15, as is apparent upon inspection of Fig. 1. The springs 27 are preferably slightly wider than the rails 20 and have the free ends thereof formed to provide bent portions 28 which are adapted to engage the slide 11 to resiliently hold the latter against the portion 15 of the adapter, as clearly shown in Fig. 4. In order that the adapter may be used with slides of varying thickness, the rails 20 are recessed at 30 so that the bent portions 28 of the springs 27 may extend thereinto to engage and hold slides of the minimum thickness used. Obviously, when slides of a thickness equal to or greater than that of the rails 20 are used, the leaf springs 27 will merely flex outwardly, as shown in Fig. 4, to engage the rear face of the slide 11 to securely hold the latter against the portion 15 of the adapter.

To facilitate removal of the slides from the adapter, the portion 15 is provided with a pair of finger openings 31 positioned adjacent the upper edges of the aperture 17, as best shown in Fig. 1. Thus by inserting the thumb and index finger through the opening 31, the upper corner 32 of the slide 11 may be grasped and the slide removed, as will be apparent upon an inspection of Fig. 1. In order to prevent light from passing through the openings 31 when the carriage is moved to projection position, means must be provided to cover these openings. This covering means is preferably in the form of a thin flexible member 33, the lower ends 34 of which are rigidly secured to the front face of the portion 15 by suitable rivets 35 or other fastening means. The upper free ends 36 of the members 33 overlie and cover the finger openings 31 to prevent light from passing therethrough, as will be apparent from an inspection of Fig. 1.

In use, a miniature slide 11 is placed in the adapter between the spring arms 27 and the rear face of the portion 15. The slide 11 is then moved downwardly, being guided into position by the rails 20, until the bottom edge 23 thereof engages the pins 22 which then supports the slide in registry with the aperture 17. When the slide 11 is to be removed, the thumb and index finger are inserted in the openings 31, thus bending the upper ends 36 of the flexible members 33 away from the portion 15. The upper corners 32 of the slide 11 can then be grasped and the slide may be removed. The members 33 then move backwardly against the front face of the portion 15 to effectively cover the openings 31 so as to prevent the passing of light therethrough, as pointed out above.

It is thus apparent from the above description that the present invention provides an adapter for use with projector slide carriages designed for standard lantern slides. It is also apparent that the adapter will securely hold and position slides of miniature film, and will also permit such slides to be readily inserted in or removed from the adapter.

While one embodiment of the invention has been disclosed, it is contemplated that the inventive idea may be carried out in a number of ways. This application is, therefore, not to be limited to the precise details described, but is intended to cover all variations and modifications thereof which fall within the spirit of the invention and the scope of the appended claims.

I claim:

1. An adapter for use with a miniature lantern slide, comprising in combination, a plate having a viewing aperture formed therein, a pair of spaced guide members on said plate adapted to engage opposite edges of said slide to position the latter in horizontal alignment with said aperture, said guide members being formed with recesses therein, pins on said plate adapted to engage another edge of said slide to support the latter, said pins cooperating with said guide members to position said slide in registry with said aperture, a pair of leaf springs overlying said guide members, and portions on said leaf spring arranged to extend into said recesses, to engage said slide to yieldably hold the latter in engagement with said plate.

2. An adapter for use with a miniature lantern slide, comprising in combination, a plate having a viewing aperture formed therein, means on said plate adapted to engage and position said slide in registry with said aperture, leaf springs mounted on one side of said plate and engaging said slide to yieldably maintain the latter in engagement with said side, said plate being formed with finger openings adjacent said aperture whereby edges of the slide may be readily grasped to facilitate the removal of the slide from the adapter, and light cover means for said finger openings.

3. An adapter for use with a miniature lantern slide, comprising in combination, a plate having a viewing aperture formed therein, means on said plate adapted to engage and position said slide in registry with said aperture, a pair of leaf springs mounted on one side of said plate and adapted to engage and hold said slide against said one side of said plate, said plate being formed with a pair of finger openings in which fingers may be inserted to grasp opposite edges of said slide to remove the latter from said adapter, and flexible strips secured to the other side of said plate and covering said finger openings.

4. An adapter for use with a miniature lantern slide, comprising in combination, a plate having a viewing aperture formed therein, a pair of spaced guide members secured to one side of said plate and adapted to engage opposite edges of said slide to position the latter in horizontal alignment with said aperture, directing surfaces on said guide members for directing the slide therebetween, each of said guide members being formed with a recess, leaf springs secured to and overlying said guide members, portions on said springs adapted to extend into said recesses to engage said slide to yieldably maintain the latter in engagement with said one side of said plate, said plate being formed with spaced finger openings to facilitate the grasping of corners of the slide to remove the latter from said adapter, and flexible members secured to the other side of said plate and having portions thereof arranged to cover said finger openings.

OTTO WITTEL.